United States Patent [19]

Bittermann et al.

[11] 3,930,939

[45] Jan. 6, 1976

[54] PRESSURE SUPPRESSION SYSTEM FOR A NUCLEAR REACTOR

[75] Inventors: Dietmar Bittermann; Claus Goetzmann; Klaus Hassmann; Hans-Joachim Preuss, all of Erlangen; Manfred Schatz, Nurnberg; Peter Rau, Mittelehrenbach, all of Germany

[73] Assignee: Siemens Aktiengesellschaft, Munich, Germany

[22] Filed: June 27, 1973

[21] Appl. No.: 374,121

[30] Foreign Application Priority Data

July 14, 1972 Germany............................ 2234782

[52] U.S. Cl.................................... 176/38; 176/87
[51] Int. Cl.².......................................... G21C 9/00
[58] Field of Search.......................... 176/37, 38, 87

[56] References Cited
UNITED STATES PATENTS

| | | | |
|---|---|---|---|
| 3,238,105 | 3/1966 | McNelly | 176/37 |
| 3,607,630 | 9/1971 | West | 176/38 |
| 3,629,064 | 12/1971 | Zivi | 176/38 |
| 3,702,802 | 11/1972 | Jansen | 176/87 |

*Primary Examiner*—Harvey E. Behrend
*Attorney, Agent, or Firm*—Kenyon & Kenyon Reilly Carr & Chapin

[57] ABSTRACT

A gas-coolant nuclear breeder reactor includes a core enclosed by a pressure vessel having a bottom beneath the core potentially capable of burning through if the core melts due to excessive operating temperatures. A basin is positioned beneath the core, either outside or inside of the pressure vessel, to intercept the melted core. The heat of the melted core must be dissipated rapidly because the reactor is enclosed by a steel containment vessel which might be unable to resist the internal pressure that would otherwise result from the heat. Therefore, means are provided for conducting a fluid coolant cooling the metal core, in the basin, from the latter to an extended area of the inside of the steel containment vessel which, being of relatively high heat conductivity, conducts the heat from the coolant to the atmosphere outside of the containment vessel. Cooling water may be sprayed on the outside of this containment vessel to assist in the dissipation of the heat. Arrangements are provided for increasing the efficiency of the heat transfer from the melted core to the fluid coolant.

6 Claims, 6 Drawing Figures

PRESSURE SUPPRESSION SYSTEM FOR A NUCLEAR REACTOR

BACKGROUND OF THE INVENTION

This invention relates to gas-coolant nuclear breeder reactors. Such a reactor is totally enclosed by a steel containment vessel. The reactor includes a core enclosed by a pressure vessel, the core including fuel elements each comprising a bundle of fuel rods which, if operated at excessive temperatures, may melt and fall. Therefore, a melt core intercept basin is positioned beneath the core. In the event the melted core falls into this basin, the core's heat must be dissipated rapidly because if uncontrolled, there may be a excessive pressure increase inside of the steel containment vessel which might damage the integrity of the latter. With adequate heat dissipation, such a pressure rise may be suppressed to a safe level.

The prior art has suggested a basin inside of the pressure vessel directly beneath the core and which is provided with indirect cooling means in the form of water pipes. The idea is to dissipate the heat, presumably through evaporation of the water forming steam, but the prior art has made no provision for handling the resulting steam in a practical manner. A concept of this kind is suggested by the German Offenlegungsschrift 2,035,089.

SUMMARY OF THE INVENTION

An object of the present invention is to provide a basin beneath the core with means for dissipating the heat of a melted core in the basin in a practical manner and at a rate preventing an excessive pressure increase within the steel containment vessel.

According to the invention, the basin may be located outside or inside of the pressure vessel, providing it is beneath the core. When the core melts, it can burn through the bottom of the pressure vessel and fall into the basin if on the latter's outside. If the basin is inside of the pressure vessel and can dissipate the melted core's heat with adequate efficiency, it may be possible to prevent the bottom of the pressure vessel from being burned through.

When outside of the pressure vessel, the basin may be very much larger transversely than the inside dimension of the pressure vessel. In this case the invention provides means, such as suitable ducts or conduits, for conducting a fluid coolant cooling the metal core in the basin, from the latter to an extended or large area of the inside of the steel containment vessel for cooling by conduction of the heat through the latter's wall to its outside which is exposed to the atmosphere. The large outside surface area of the containment vessel provides extensive heat dissipation both by convection and radiation. This external heat dissipation may be considerably increased by spraying water on the outside of the containment vessel.

Using ducts, the heated coolant is carried to the inside of the top of the containment vessel where the coolant gives up its heat, the heat loss being rapid if the top of the containment vessel is water-sprayed on its outside, the cooled fluid coolant then falling within the containment vessel for return to the basin beneath the pressure vessel. Thus, a circulation is established.

The basin may be positioned inside of the pressure vessel beneath the core and provided with bottom cooling means, such as a chamber beneath the basin inside of the pressure vessel and containing water converting to steam when heated by the melted core, via conduction through the basin, and thereby forming the fluid coolant conducted by the conducting means to the inside of the containment vessel, preferably to the top of the containment vessel.

In the first instance, when the basin is outside of the pressure vessel, the fluid coolant may consist of the gas atmosphere normally maintained inside of the containment vessel during normal reactor operation. This gas is capable of circulating, rising when heated, and falling when cooled. When the basin is on the inside of the pressure vessel, the steam rises when hot and falls when cooled or as condensate, effecting circulation via the chamber beneath the basin on the inside of the pressure chamber. In the latter instance, the top of the containment vessel may be double-walled to form a chamber into which the steam is sent and from which the condensate is returned to the chamber beneath the basin.

When the basin is inside of the pressure chamber, a refractory, such as graphite, is indicated as the basin material, and in this case, particularly, the uniformity and efficiency of the necessary heat transfer may be increased by the use of a low melting temperature metal positioned either inside the basin or in passages formed in the basin or in the chamber beneath the basin or combinations of these possibilities, such a metal forming a molten bath providing both uniformity and efficiency for the heat transfer to the coolant by conduction through the molten metal and uniform transfer relative to the basin which may be possibly of low thermal conductivity.

BRIEF DESCRIPTION OF THE DRAWINGS

Preferred embodiments of the invention are illustrated schematically by the accompanying drawings, in which.

DESCRIPTION OF THE PREFERRED EMBODIMENTS

Figures 1, 1A:
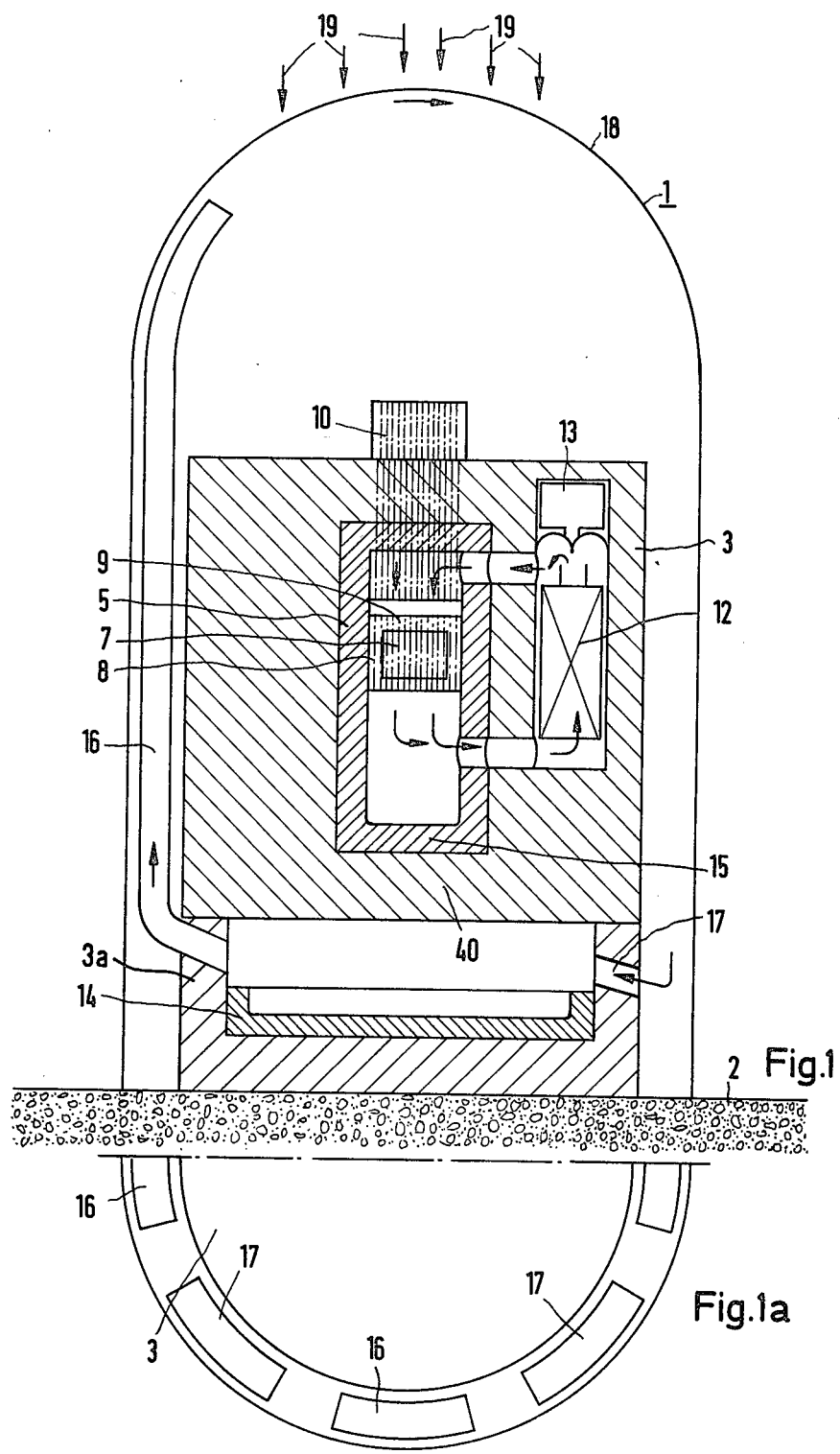
FIG. 1 is a vertical section of a gas-coolant nuclear breeder reactor showing the melted core intercept basin outside of the pressure vessel with a single duct carrying the fluid coolant from the basin to the top of the containment vessel enclosing the reactor.
FIG. 1a is a partial cross-section showing how a plurality of the ducts may be provided.

Having reference to FIG. 1, the outermost steel containment vessel 1 has a cylindrical side wall and a hemispherical top and the vessel totally encloses the reactor and its associated components. A concrete floor 2 supports the entire installation. The reactor pressure vessel 3, made of prestressed concrete, has an internal liner 5 which shields the concrete against radiation and within which the reactor core 7 is located, surrounded by a radial breeder jacket 8 and an axial breeder jacket 9. The core's components are supported by a mounting 10 on the outside of the pressure vessel. The pressure vessel 3 also encloses a steam generator 12 through which the gas coolant is circulated as indicated by the unnumbered arrows, the circulation being aided by a blower 13.

In this instance the basin 14 is on the outside of the pressure vessel 3, it being located below the bottom 15 of the liner 5 and, of course, below the core 7. If the core is operated at excessively high temperatures, and melts and falls into the bottom 15, it potentially may burn through this bottom and the intervening concrete of the pressure vessel 3, to fall into the basin 14.

The containment vessel 1 normally contains a gas and in the present embodiment this gas is used as a fluid coolant to effect the necessary dissipation of the heat of the melted core in the basin 14, the latter being of large horizontal transverse area permitting possible spreading of the core. The basin 14 is spaced below the bottom of the pressure vessel 3 and is enclosed by a vertical wall 3a which also functions to support the pressure vessel above the floor 2.

To use the gas in the containment vessel 1 as a coolant for the basin's contents, a duct 16 extends through the wall 3a and upwardly, above the pressure vessel 3, and opens into the top of the containment vessel 1. The wall 3a has an inlet port 17, and so the heated gas can rise through the duct 16, flow along the inside of the containment vessel 1 for cooling by heat conduction through the latter's wall to the outside atmosphere, and when cooled, flow downwardly and in through the inlet port 17, the result being a constant circulation of the gas coolant.

The top 18 of the containment vessel 1 has the hemispherical shape and the entire containment vessel is made of steel having good thermal conductivity. The duct 16 distributes the heated gas over a large area of the top 18, and water cooling sprays 19 are provided by nozzles (not shown) to shower down on the top 18.

As shown by FIG. 1a, there are preferably a plurality of the ducts 16 and a plurality of the ports 17, this causing the circulating flow of gas coolant to be very widely distributed throughout the interior of the water cooled top 18 of the steel containment vessel. Although not shown, the ports 17 may have ducts which, like the ducts 16, extend upwardly so that the top 18 functions as the main cooling area for the gas-coolant.

It follows that in the event of an accident, the melted core in the basin 14 is automatically and immediately subjected to very rapid cooling by large volumes of gas effectively cooled by the large area of the water-cooled hemispherical top 18 of the steel containment vessell.

Figure 2:
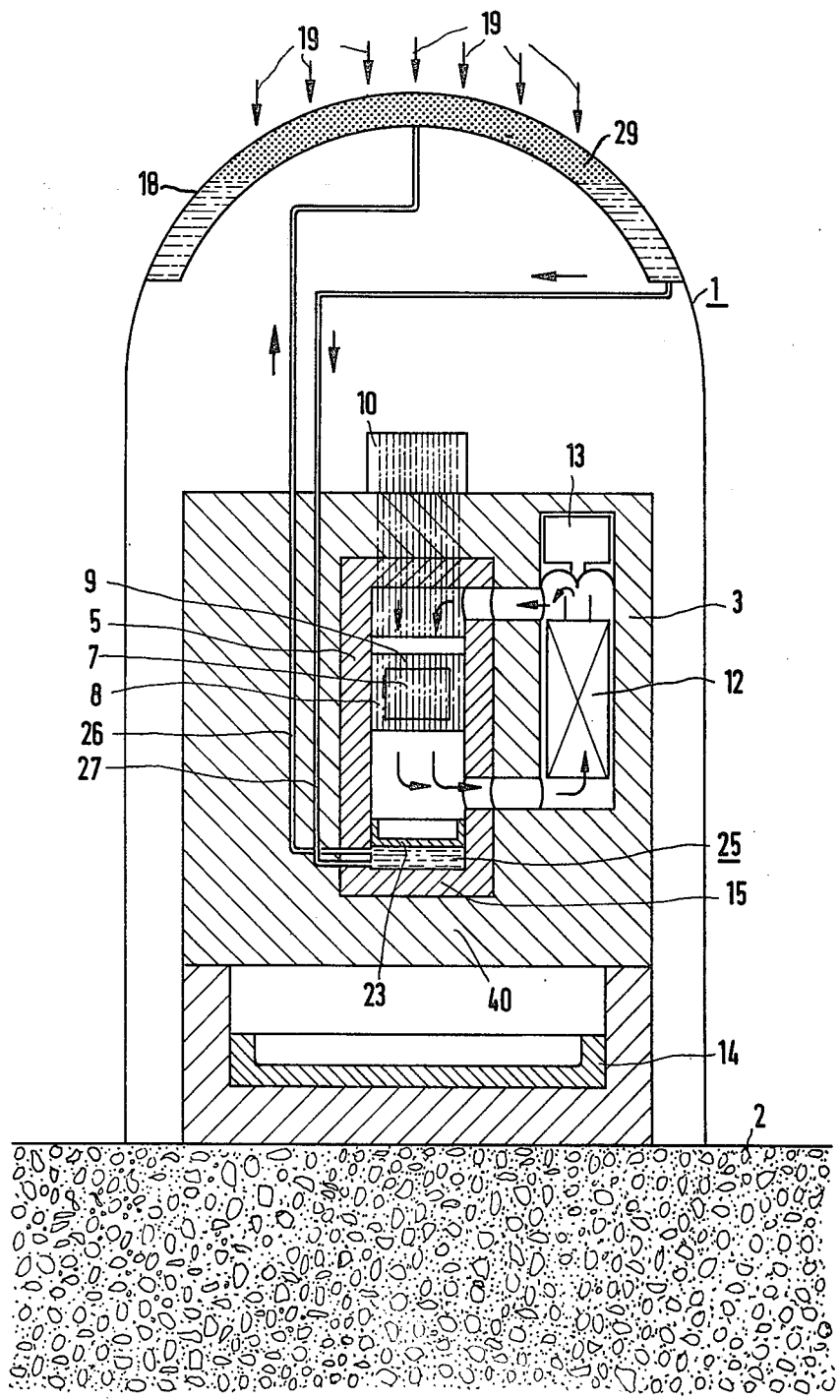
FIG. 2 corresponds to FIG. 1 but in this case shows the basin inside of the pressure vessel.

In FIG. 2 the basin 23 is located inside of the pressure vessel 3 directly beneath the core 7 and is provided beneath its bottom with a chamber 25 containing water. If the core 7 melts, and falls into the basin 23, the water is converted to steam and a pipe 26 carries this steam upwardly to the hemispherical top 18 for condensation, the condensate returning via a pipe 27 to the chamber 25, thus establishing circulation. In this case the hemispherical top 18 is a double-walled construction forming a hemispherical chamber 29 into the central portion of which the pipe 26 connects, the pipe 27 connecting with a lowermost portion of this chamber 29. A plurality of these pipes may be used in each instance. The water spraying means 19 are, of course, also used. The very large extent of the chamber 29 provides for very effective dissipation of large amounts of heat and provides an effective means for handling the steam incidental when the water in the chamber 25 is converted to steam by the heat of a melted core in the basin 23. The containment vessel's large top 18 functions as a large capacity heat exchanger. As shown, the pipe 26 connects with the upper portion of the chamber 25; the pipe 26 connects with the chamber's lower portion.

Figure 3:
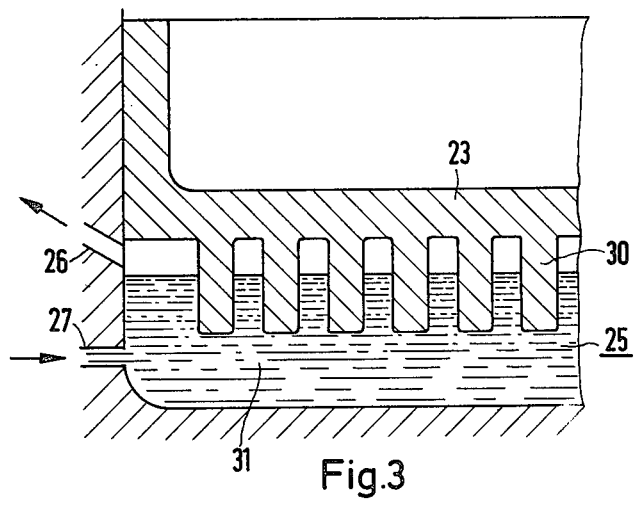
FIG. 3 on an enlarged scale shows a detail of the basin illustrated by FIG. 2, in modified form.

As shown by FIG. 3, the basin 23 may be provided with downwardly extending ribs 20 projecting downwardly far enough to be within the solid water 31 in the chamber 25. If this is not done, the steam can separate the water from the bottom of the basin 23 with the result that the bottom could not transmit heat by direct conduction to the water.

The basin 23 forms the primary intercept for an accidentally melted core and must withstand extreme temperatures. Therefore, it is preferably made of a refractory, such as graphite, inevitably having lower thermal conductivity than metal.

Figure 4:
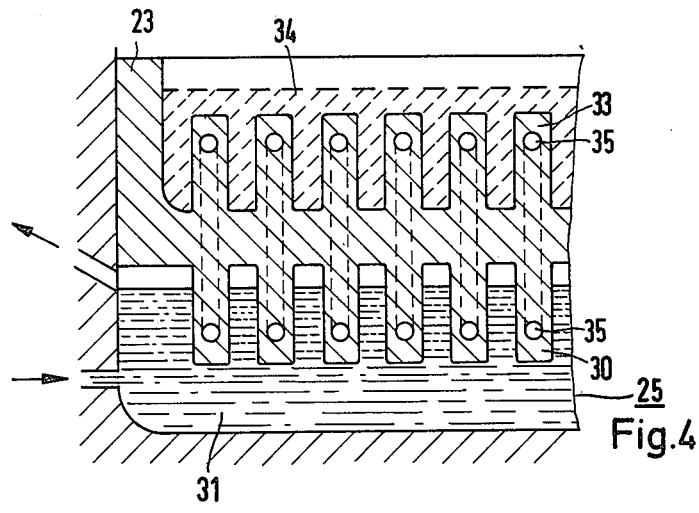
FIG. 4 is like FIG. 3 but shows another modification.

Therefore, in FIG. 4 the efficiency provided by the ribs 30 is greatly increased by corresponding ribs 33 which extend upwardly into the basin 23 where the ribs 33 are embedded in metal 34 having a lower melting temperature. Metals such as mercury, tin, lead and the like may be used. If a component of the core melts and falls, it can cause extreme local overheating of the basin 23 in FIG. 3, but using this metal 34, as shown in FIG. 4, the metal forms a pool of metal of much higher thermal conductivity than graphite or other refractory, distributing the heat substantially uniformly throughout the basin 23. In FIG. 4 the distribution is throughout all of the upwardly projecting ribs 33.

To further assist in the thermal conductivity efficiency, the ribs 30 and 33, which are in mutual registration, are provided with endless passages 35 arranged as loops extending from one registered rib to the other and filled with the metal of low melting temperature. When melted by heat occasioned by an accident, this metal establishes a circulating flow of molten metal from the molten metal 34 to the water 31 in the chamber 25, the intervening refractory portions being of small thickness.

Figure 5:
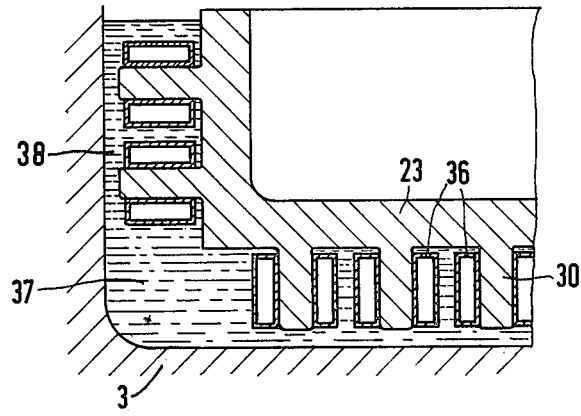
FIG. 5 is again like FIG. 3, but shows still another modification.

In FIG. 5 the ribs 30 are shown in direct contact with water pipes 36 which may be connected in circuit with the chamber 29 in the containment vessel's top 18, as by using pipes corresponding to 26 and 27 in FIG. 2, the details of this being easily understood and, therefore, not illustrated. The low melting temperature metal previously described may be used to surround the fins 30 and pipes 36, as shown at 37, and the chamber 31 may be extending upwardly around the side wall of the basin 23 by forming the chamber as shown at 38, the side wall of the basin being itself provided with the ribs 30 and water pipes 36. In this instance also the metal 37, when liquid, uniformly and widely distributes the heat while conducting it to the water which abstracts the heat by its conversion to steam, the latter being sent to the chamber 29 and returned as condensate.

The construction shown by FIGS. 2 through 5 provides for a primary intercept of a melted core. If the core burns through the basin 23, the bottom 15 of the liner 5 and the intervening concrete portion 40 of the pressure vessel 3, it falls into the external basin 14 providing the ultimate intercept. Prior to this occurring the basin 14, in effect, is provided with a cover which is destructible by heat in the event a melted core goes through the various parts just mentioned. This concept may be applied to the basin 23 by providing it with a destructible cover (not shown for the basin 23) which closes its top against the flow of the gas-coolant during the normal operation of the reactor generating steam via the steam generator 12.

As explained in connection with the FIG. 2 embodiment, the top 18 of the containment vessel 1 may be a double-walled construction forming the chamber 29 for the steam and condensate. Correspondingly, in the FIG. 1 construction the ducts 16 and 17 may be provided by passages formed by the double walls of the containment vessel, illustrated by FIG. 1a.

What is claimed is:

1. A gas-coolant nuclear reactor including a core enclosed by a pressure vessel, a melted core intercept basin below the core and a metal containment vessel enclosing the vessel and basin and having a metal top having an outer surface which is exposed to the outside of the top; wherein the improvement comprises means for conducting a fluid coolant cooling a melted core in said basin, from the basin to an extended area of the inside of said top of said metal containment vessel for cooling by the conduction of heat through the containment vessel's wall to the outside of the containment vessel, said top of said containment vessel having double walls between which said conducting means connects.

2. A gas-coolant nuclear reactor comprising a core, a pressure vessel having an inside enclosing said core and an outside, and a basin below said core and positioned to intercept said core in the event the core melts and falls, said pressure vessel forming an enclosure above said basin, a steel containment shell enclosing said pressure vessel and said basin and having a heat-conductive upper portion extending above the pressure vessel and basin, the steel shell's said upper portion having an outside exposed to the atmosphere outside of the containment shell, said upper portion having an inside, ducts connecting with said basin and extending upwardly and opening to the steel shell's said inside and extending from said inside downwardly and back to said basin, and a coolant in contact with said basin for removing heat from said core in the event it melts and falls and is intercepted by the basin, said ducts connecting with said basin to conduct said coolant when thermally rising from the basin, to said inside of said upper portion of said steel containment shell and, when cooled by conduction of heat through said upper portion to its said outside, to conduct said coolant back to said basin, said pressure vessel, said basin, said ducts and said inside of said upper portion of said steel containment shell cooperatively forming a recirculation circuit for said coolant.

3. The installation of claim 2 in which said basin is positioned on the outside of and below said pressure vessel inside of said shell.

4. The installation of claim 3 which said coolant is formed by a gas atmosphere contained between the outside of said pressure vessel and the inside of said shell, and said basin has an inside and an open top directly facing the pressure vessel's said outside, said ducts connecting said gas atmosphere with the inside of said basin.

5. The installation of claim 2 in which said basin is positioned on the inside of said pressure vessel, and a second basin is positioned on the outside of and below said pressure vessel inside of said steel shell.

6. The installation of claim 2 in which said basin is positioned on the inside of said pressure vessel and said coolant is a material which vaporizes under the heat of a melted core falling into said basin, and having means for separating said coolant from the inside of said pressure vessel.

* * * * *